United States Patent
Kumar et al.

(10) Patent No.: US 10,057,548 B2
(45) Date of Patent: Aug. 21, 2018

(54) SMART CLOSURE UNIT FOR A WRITING APPARATUS

(71) Applicant: Wipro Limited, Bangalore (IN)

(72) Inventors: Vijay Kumar, Bangalore (IN); Thomas Chittakattu Ninan, Kerala (IN)

(73) Assignee: WIPRO LIMITED, Bangalore (IN)

( * ) Notice: Subject to any disclaimer, the term of this patent is extended or adjusted under 35 U.S.C. 154(b) by 261 days.

(21) Appl. No.: 14/995,524

(22) Filed: Jan. 14, 2016

(65) Prior Publication Data

US 2017/0155876 A1 Jun. 1, 2017

(30) Foreign Application Priority Data

Nov. 30, 2015 (IN) .......................... 6434/CHE/2015

(51) Int. Cl.
*H04N 7/00* (2011.01)
*H04N 7/18* (2006.01)
(Continued)

(52) U.S. Cl.
CPC .............. *H04N 7/183* (2013.01); *B43K 8/02* (2013.01); *B43K 23/12* (2013.01); *B43K 29/003* (2013.01);
(Continued)

(58) Field of Classification Search
CPC ..... G06F 3/0346; G06F 3/03545; G01B 7/00; G01B 7/003; G01B 7/14; B41J 2/17546; G01L 1/144; G01L 1/148; Y10T 137/8242
See application file for complete search history.

(56) References Cited

U.S. PATENT DOCUMENTS 4,881,088 A * 11/1989 Fisher, Jr. ................ B43K 5/12
                                                        116/110
5,886,718 A * 3/1999 Johnson ................. G01D 15/18
                                                        347/85
(Continued)

FOREIGN PATENT DOCUMENTS

CN       201124660       10/2008
CN       204172546       2/2015
(Continued)

OTHER PUBLICATIONS

Extended European Search Report from the European Patent Office in counterpart European Application No. 615375.4 dated May 26, 2017, 8 pages.

*Primary Examiner* — Frank Huang
(74) *Attorney, Agent, or Firm* — Finnegan, Henderson, Farabow, Garrett & Dunner LLP (57) ABSTRACT

The present disclosure relates to a smart closure unit for a writing apparatus. The closure unit comprises a diaphragm film, a camera and a control unit. The diaphragm film comes in contact with writing nib of the writing apparatus when the writing apparatus is closed by the closure unit. The camera captures an image of the diaphragm film when the writing nib of the writing apparatus is in contact with the diaphragm film. The control unit compares the captured image received from the camera with one or more predefined images, wherein each of the predefined images is associated with an ink intensity value. The ink intensity value indicates percentage of ink present in the writing apparatus. The control unit further detects the ink intensity value corresponding to the matched predefined image. Furthermore, a user interface in the closure unit displays one or more information related to the writing apparatus.

21 Claims, 7 Drawing Sheets

(51) Int. Cl.
- *B43K 8/02* (2006.01)
- *B43K 23/12* (2006.01)
- *B43K 29/00* (2006.01)
- *B43K 29/08* (2006.01)
- *G06F 3/0484* (2013.01)
- *G06F 3/0488* (2013.01)
- *G06K 9/62* (2006.01)
- *G06T 7/20* (2017.01)
- *G01M 99/00* (2011.01)

(52) U.S. Cl.
CPC ............ *B43K 29/004* (2013.01); *B43K 29/08* (2013.01); *G01M 99/00* (2013.01); *G06F 3/0488* (2013.01); *G06F 3/04847* (2013.01); *G06K 9/6202* (2013.01); *G06T 7/20* (2013.01)

(56) References Cited

U.S. PATENT DOCUMENTS 6,172,697 B1 * 1/2001 Lee .................... G03G 15/0856
    347/158
2014/0069532 A1 * 3/2014 Obata .................... G06F 3/046
    137/554

FOREIGN PATENT DOCUMENTS

| | | |
|---|---|---|
| CN | 104442088 | 3/2015 |
| JP | 2003-19892 | 1/2003 |
| JP | 2012-247900 | 12/2012 |

\* cited by examiner

SMART CLOSURE UNIT FOR A WRITING APPARATUS

The following specification particularly describes the invention and the manner in which it is to be performed.

TECHNICAL FIELD

The present subject matter is related, in general to writing apparatus, and more particularly, but not exclusively to a method and system for determining ink intensity value in a writing apparatus using a closure unit of the writing apparatus.

BACKGROUND

Despite the advancements in computing devices, a user still finds it very much comfortable to use the combination of a board and a writing apparatus. This is especially, in a group discussion or meetings that, a participating user could easily capture and express ideas being discussed about. There is no doubt that a pen-paper combination immensely contributes to a creative discussion as in many cases it is much easier to use our own hands rather than doing those stuff using computers. The boards could be made of laminates or papers, and whereas the writing apparatus could be a pen or a board marker.

However, as would be the case in reality, it has been found very often that when a user picks up a marker to write or draw something on the board the ink in the marker could be excessively low or completely dried leading to unreadable marks or no marks at all by pen when used on the board. Hence, it causes an instantaneous hindrance to the flow of the discussion, putting the presenters and participants at unease. To overcome the aforementioned problem, such stationary materials could be routinely checked and replenished by maintenance staffs on need basis. However, the availability of a working writing apparatus still remains an unsolved problem. In an organization, such an issue is indirectly and silently impacting on the efficiency of meetings and productivity of its employees.

One of the conventional techniques discloses a method to convert ballistic movement of a pen, for example, the movement of pen point across a surface into thickness information of the writing ink in the pen. A user can predict the amount of writing ink present in the pen based on the thickness information. However, the above stated method does not address the problem of detecting the intensity of the writing ink present in the pen on a real-time basis.

The issues mainly faced in the existing writing apparatus are determining the ink intensity level of writing ink in the writing apparatus When the user picks up the writing apparatus and notifying the status of the writing apparatus to the concerned management personnel or the user in real-time and also with a preset periodicity and/or when a threshold ink intensity level is reached.

SUMMARY

Disclosed herein is a smart closure unit for a writing apparatus. The closure unit detects ink intensity value of writing ink in the writing apparatus, when the writing apparatus is closed by the closure unit. Further, the closure unit provides a notification in real-time to one or more users and maintenance personnel associated with the writing apparatus when the ink intensity value of the writing ink is less than a predetermined value.

Accordingly, the present disclosure relates to a smart closure unit for a writing apparatus. The closure unit comprises a diaphragm film, a camera and a control unit. The diaphragm film comes in contact with writing nib of the writing apparatus when the writing apparatus is closed by the closure unit. The camera captures an image of the diaphragm film when the writing nib of the writing apparatus is in contact with the diaphragm film. The control unit is configured to compare the captured image received from the camera with one or more predefined images, wherein each of the one or more predefined images is associated with an ink intensity value. The ink intensity value indicates percentage of ink present in the writing apparatus. The control unit further detects the ink intensity value corresponding to the matched predefined image. Upon detecting the ink intensity value, a user interface in the closure unit displays one or more information including the ink intensity value.

Further, the present disclosure relates to a method for determining ink intensity value in a writing apparatus when the writing apparatus is closed by a closure unit. The method comprises capturing an image of a diaphragm film when a writing nib of the writing apparatus is in contact with the diaphragm film. Upon capturing the image of the diaphragm, the captured image received from the camera are compared with one or more predefined images, wherein each of the one or more predefined images is associated with an ink intensity value, wherein the ink intensity value indicates percentage of ink present in the writing apparatus. Further, the ink intensity value corresponding to the matched predefined image is detected. Furthermore the method comprises displaying one or more information including the ink intensity value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 3 illustrates a flowchart showing method for determining ink intensity value in a writing apparatus in accordance with some embodiments of the present disclosure; and It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for determining ink intensity value in a writing apparatus when the writing apparatus is closed by a closure unit. The closure unit comprises a diaphragm film, a camera and a control unit. The diaphragm film comes in contact with writing nib of the writing apparatus when the writing apparatus is closed by the closure unit. The camera captures an image of the diaphragm film when the writing nib of the writing apparatus is in contact with the diaphragm film. The control unit is configured to compare the captured image received from the camera with one or more predefined images, wherein each of the one or more predefined images is associated with an ink intensity value, wherein the ink intensity value indicates percentage of ink present in the writing apparatus. The control unit further detects the ink intensity value corresponding to the matched predefined image. Upon detecting the ink intensity value, a user interface in the closure unit displays one or more information including the ink intensity value.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
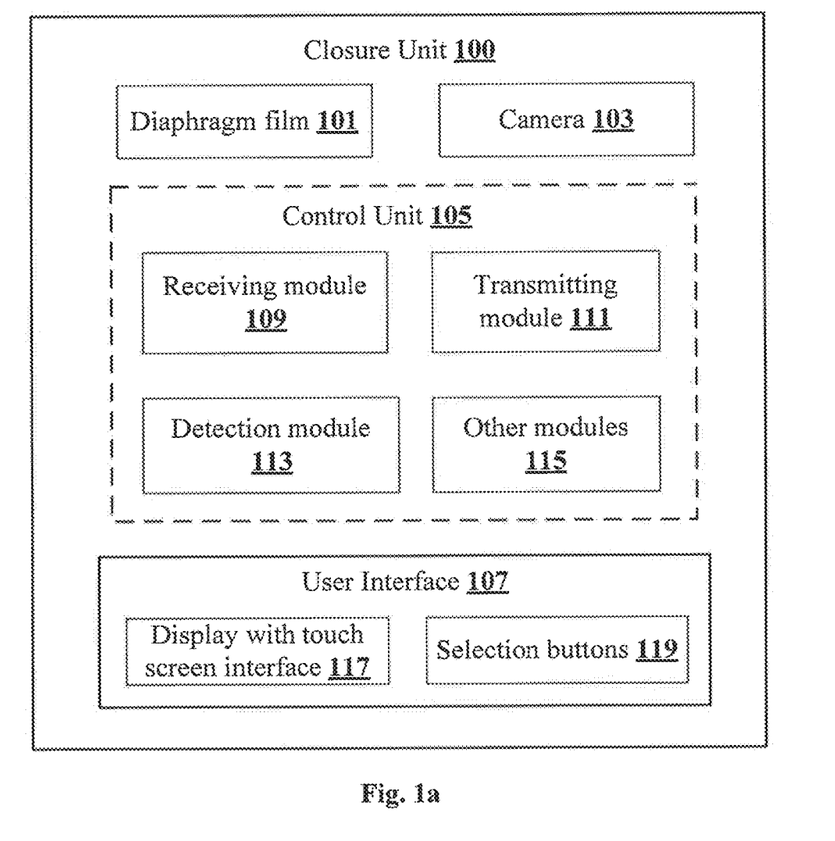
FIGS. 1a and 1b show a detailed block diagram illustrating a closure unit for a writing apparatus in accordance with some embodiments of the present disclosure.
Figure 1B:
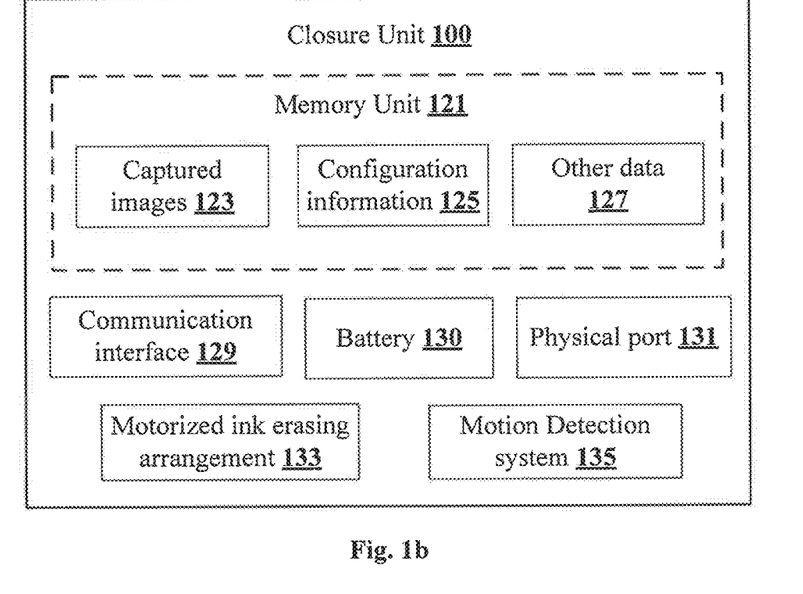

FIGS. 1a and 1b show a detailed block diagram illustrating a closure unit for a writing apparatus in accordance with some embodiments of the present disclosure.

In an exemplary implementation, as shown in FIG. 1a, the closure unit 100 comprises a diaphragm film 101, a camera 103, a control unit 105 and a user interface 107.

In an embodiment, the diaphragm film 101 is made of a transparent material. In another embodiment, the diaphragm film 101 is made of a translucent material. The diaphragm film 101 is in the form of a thin slice formed of at least one of aforesaid material or any other material having similar properties, which comes in contact with writing nib 205 of the writing apparatus 203 when the writing apparatus 203 is closed by the closure unit 100. The writing nib 205 of the writing apparatus 203 leaves a trace of writing ink on the diaphragm film 101, when the writing nib 205 comes in contact with the diaphragm film 101. In an embodiment, the diaphragm film 101 may be configured to move across a predetermined direction in order to make a contact with the writing nib 205 of the writing apparatus 203 when the writing apparatus 203 is displaced from a resting position, for example, when user picks up the writing apparatus from its original position or at a preset periodicity. In yet another embodiment, the diaphragm film 101 may be detachable from the closure unit 100 for performing one or more operations. The one or more operations performed on the diaphragm includes, but not limited to, cleaning the diaphragm film 101 and replacing the diaphragm film 101 after a predetermined time period.

The camera 103 in the closure unit 100 captures an image of the diaphragm film 101 when the writing nib 205 of the writing apparatus 203 is in contact with the diaphragm film 101. The camera 103 may be further configured with a flash light for enabling the camera 103 to capture a clear and good quality image of the diaphragm film 101 such that the control unit 105 may understand and process the captured image 123. In another embodiment, the camera 103 may be an image sensor that captures the traces of the writing ink formed on the diaphragm film 101. In yet another embodiment, the camera 103 may be detachable from the closure unit 100.

The user interface 107 includes a display with touch screen interface 117 and one or more selection buttons 119. In an embodiment, the display with touch screen interface 117 may be used to display one or more information related to the writing apparatus 203 and the closure unit 100. The one or more information comprises at least one of percentage of ink intensity value of the writing ink in the writing apparatus 203, percentage of battery 130 remaining in the closure unit 100, color of the writing ink in the writing apparatus 203, location of the writing apparatus 203, model information of the writing apparatus 203 and estimated writing time of the writing apparatus 203. In another embodiment, the display with touch screen interface 117 may be configured to receive one or more inputs from the user of the writing apparatus 203. As an example, the inputs received from the users may include, but not limited to, the configuration information 125 related to the writing apparatus 203.

In an embodiment, the one or more selection buttons 119 allow the user of the writing apparatus 203 to notify one or more maintenance personnel about the status of the writing apparatus 203. The maintenance personnel may perform one or more appropriate actions upon receiving the notification from the closure unit 100. The one or more actions performed by the maintenance personnel may include, but not limited to, replenishing the writing ink and charging the battery 130 of the closure unit 100.

The control unit 105 may include, but not limited to, a receiving module 109, a transmitting module 111, a detection module 113 and one or more other modules 115. The memory unit 121 stores one or more captured images 123 of the diaphragm, one or more configuration information 125 related to the writing apparatus 203 and other data 127.

In one embodiment, the data may be stored in the memory unit 121 in the form of various data structures. Additionally, the aforementioned data can be organized using data models, such as relational or hierarchical data models. The other data 127 may store data, including temporary data and temporary files, generated by modules for performing the various functions of the closure unit 100.

In an embodiment, the receiving module 109 is configured to receive one or more signals and data from the one or more modules of the closure unit 100. As an example, the receiving module 109 may receive signals from the user selection of one of selection buttons 119 for performing one or more actions related to the writing apparatus 203. In an embodiment, the transmitting module 111 may transmit one or more control signals from the control unit 105 to one of the one or more modules of the closure unit 100. As an example, the transmitting module 111 may also transmit one or more images of the diaphragm film 101, captured by the camera 103, to the detection module 113.

In an embodiment, the detection module 113 compares the images captured from the camera 103 with one or more predefined images to determine the ink intensity value associated with the captured image 123. Each of the one or more predefined images is associated with an ink intensity value. The ink intensity value indicates percentage of ink present in the writing apparatus 203. In another embodiment, the detection module 113 may determine the writing time of the writing apparatus 203 based on the ink intensity value of the writing ink in the writing apparatus 203. In yet another embodiment, the detection module 113 may be further configured to determine the percentage of battery 130 remaining in the closure unit 100 and the ink intensity value of the writing ink in the writing apparatus 203 at one or more predetermined time intervals.

In an alternative implementation, the closure unit 100, in addition to components disclosed in FIG. 1a, comprises a memory unit 121, a communication interface 129, one or more physical ports 131, a motorized ink erasing arrangement 133, a motion detection system 135 and a battery 130 as shown in FIG. 1b. In an embodiment, the communication interface 129 may include, but not limited to, a wireless communication technique such as Bluetooth, NFC and Wi-Fi. One of the communication interface 129 configured in the closure unit 100 may be used to perform one or more actions including transmission of one or more information, related to the writing apparatus 203, to the maintenance personnel. In another embodiment, the communication interface 129 may further include one or more localization techniques including Wi-Fi triangulation and Wi-Fi fingerprinting. The localization techniques may be used for detecting location of the closure unit 100. As an example, the location of the closure unit 100 is the location of the conference room in which the writing apparatus 203, closed by the closure unit 100, is placed.

In an embodiment, the closure unit 100 may comprise a physical port 131 used for configuring the closure unit 100 with one or more configuration information 125 related to the writing apparatus 203. As an example, the one or more configuration information 125 comprises at least one of location of the writing apparatus 203, model information of the writing apparatus 203 and color of the writing ink in the writing apparatus 203. In another embodiment, the physical port 131 may be used for charging the battery 130 of the closure unit 100.

In an embodiment, the motorized ink erasing arrangement 133 in the closure unit 100 may be used for erasing traces of the writing ink, formed on the diaphragm film 101, when the closure unit 100 is removed from the writing apparatus 203. The traces of the writing ink in the diaphragm film 101 are erased in order to capture a fresh image of the diaphragm film 101 having a fresh trace of the writing ink.

In an embodiment, the motion detection system 135 configured in the closure unit 100 performs the action of detecting movement of the closure unit 100, along with the writing apparatus 203, from a resting position. The motion detection system 135 may further transmit an activation signal to activate the camera 103 and the control unit 105 upon detecting movement of the closure unit 100. In another embodiment, the motion detection system 135 may also monitor the closure and removal of the closure unit 100 from the writing apparatus 203. The removal and closure activities of the closure unit 100 is monitored in order to transmit an activation signal to the motorized ink erasing arrangement 133 When the closure unit 100 is removed from the writing apparatus 203.

FIGS. 2a-2e show exemplary representations of the closure unit for a writing apparatus in accordance with some embodiments of the present disclosure.

Figure 2A:
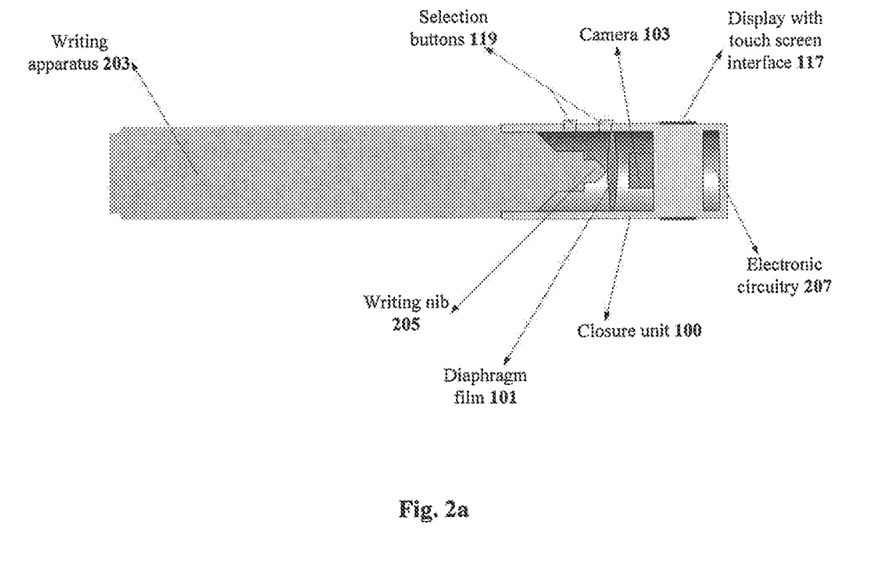
FIGS. 2a-2e show exemplary representations of the closure unit for a writing apparatus in accordance with some embodiments of the present disclosure.

As shown in FIG. 2a, the writing apparatus 203 is closed by the closure unit 100 when not in use. The closure unit 100 comprises the diaphragm film 101, the camera 103, the display with touch screen interface 117, the one or more selection buttons 119 and an electronic circuitry unit 207. The electronic circuitry 207 may include, but not limited to, control unit 105, memory unit 121, battery 130, communication interfaces 129 and the physical port 131.

Figure 2B:
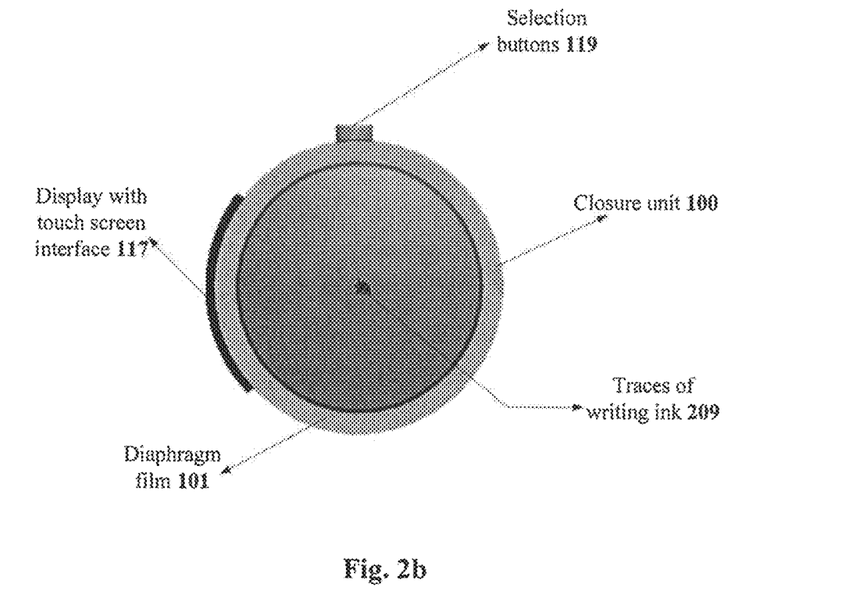
Figure 2C:
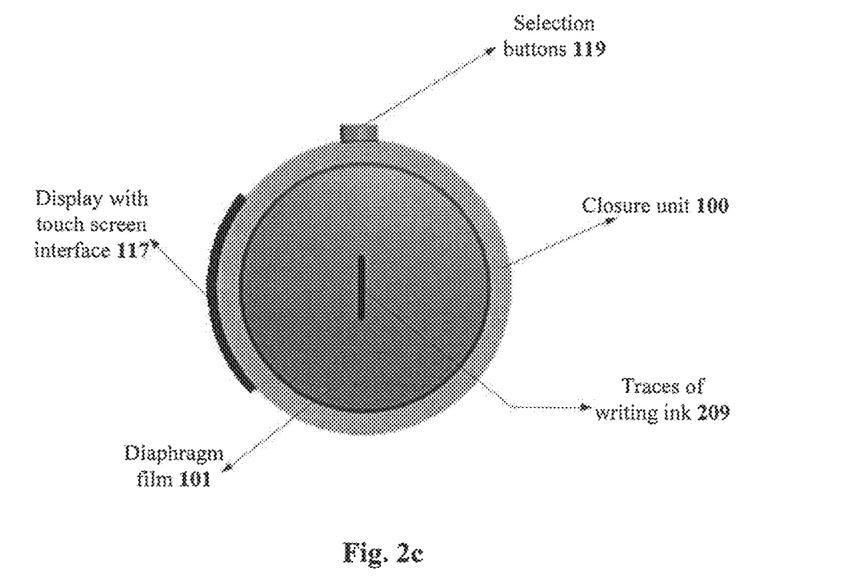

In an embodiment, the diaphragm film 101 of the closure unit 100 comes in contact with the writing nib 205 of the writing apparatus 203 when the writing apparatus 203 is closed by the closure unit 100. This causes the writing nib 205 to leave traces of the writing ink on the diaphragm film 101. As shown in FIG. 2b, in an embodiment, the traces of the writing ink 209 formed on the diaphragm film 101 can be a single dot when the writing nib 205 touches the diaphragm film 101 at a single point of contact. In another embodiment, the traces of the writing ink 209 formed on the diaphragm film 101 may take the form of a line as shown in FIG. 2c. The traces of the writing ink 209 forms a line on the diaphragm film 101 when the writing nib 205 touches the diaphragm film 101 at more than one points of contact. The writing nib 205 touches the diaphragm film 101 at multiple points of contact when the diaphragm film 101 is configured to move across one or more predetermined directions in the closure unit 100. In an embodiment, the camera 103 in the closure unit 100 captures the image of the diaphragm film 101, having traces of the writing ink 209, when the writing apparatus 203 is closed by the closure unit 100.

Figure 2D:
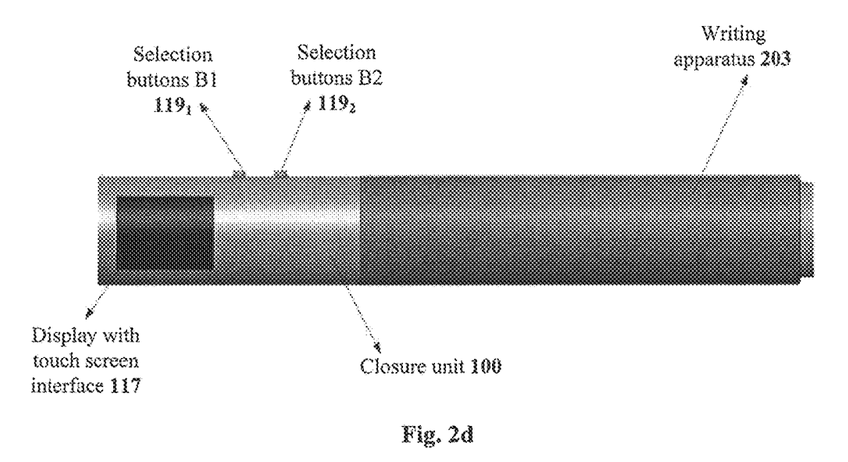

In an embodiment, the detection module 113 configured in the control unit 105 of the closure unit 100 compares the one or more captured images 123 with the one or more predefined images saved in the memory unit 121. Each of the one or more predefined images is associated with an ink intensity value. Upon comparison, the detection module 113 determines the ink intensity value of the captured image 123. As an example, the memory unit 121 may comprise 4 predefined images, namely, predefined image 1, predefined image 2, predefined image 3 and predefined image 4. Further, let the ink intensity value associated with the predefined image 1 be 25%, predefined image 2 be 50%, predefined image 3 be 75% and predefined image 4 be 100%. In an embodiment, the detection module 113 compares the captured image 123 of the diaphragm film 101 with each of the 4 predefined images to determine the ink intensity value of the captured image 123. The ink intensity value of the captured image 123 is determined to be one of a value between 0 and 100% based on a best match established for the captured image 123. As an example, the ink intensity value of the captured image 123 is determined to be 25% when the captured image 123 best matches with the predefined image 1. In an embodiment, the display with touch screen interface 117, as shown in FIG. 2*d*, displays the ink intensity value of the writing ink in the writing apparatus 203 as 25%. Further, the user may use one of the one or more selection buttons 119 to send the one or more notifications to the maintenance personnel associated with the writing apparatus 203, since the ink intensity value of the writing ink is less than 25%.

In an embodiment, there may be two selection buttons, B1 119₁ and B2 119₂ in the closure unit 100. The selection button B1 119₁ may be used to notify the ink intensity value of the writing ink to the maintenance personnel. Similarly, the selection button B2 119₂ may be used to notify the maintenance personnel when the power level is less than a predetermined value, say 10%. Number of buttons illustrated on the writing apparatus is for illustration purpose only and should not be construed as limitation of the present disclosure. Number of buttons may be varied as per the user requirements.

Figure 2E:
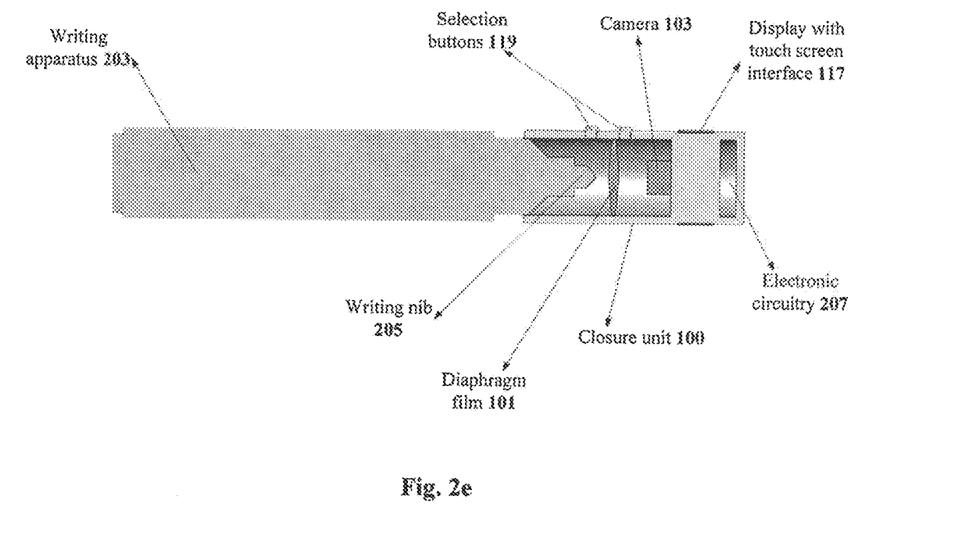

In an embodiment, as shown in FIG. 2*e*, the closure unit 100 may be removed from the writing apparatus 203 when the writing apparatus 203 is being used by a user. Upon removal of the closure unit 100 from the writing apparatus 203, the motorized ink erasing arrangement 133, configured in the closure unit 100, erases the traces of the writing ink formed on the diaphragm film 101. The traces of the writing ink formed on the diaphragm film 101 may be erased in order to clean the diaphragm film 101 for further use by the user. The fresh image of the diaphragm film 101 may be captured when the writing apparatus 203 is closed by the closure unit 100 after its use by the user.

In an alternative embodiment, the control unit 105, the one or more selection buttons 119, the display with touch screen interface 117, the motorized ink erasing arrangement 133, the motion detection system 135 and the electronic circuitry including the battery 130, communication interface 129 and the physical port 131 may be placed on the writing apparatus 203 instead of the closure unit 100 and are detachable.

Figure 3:
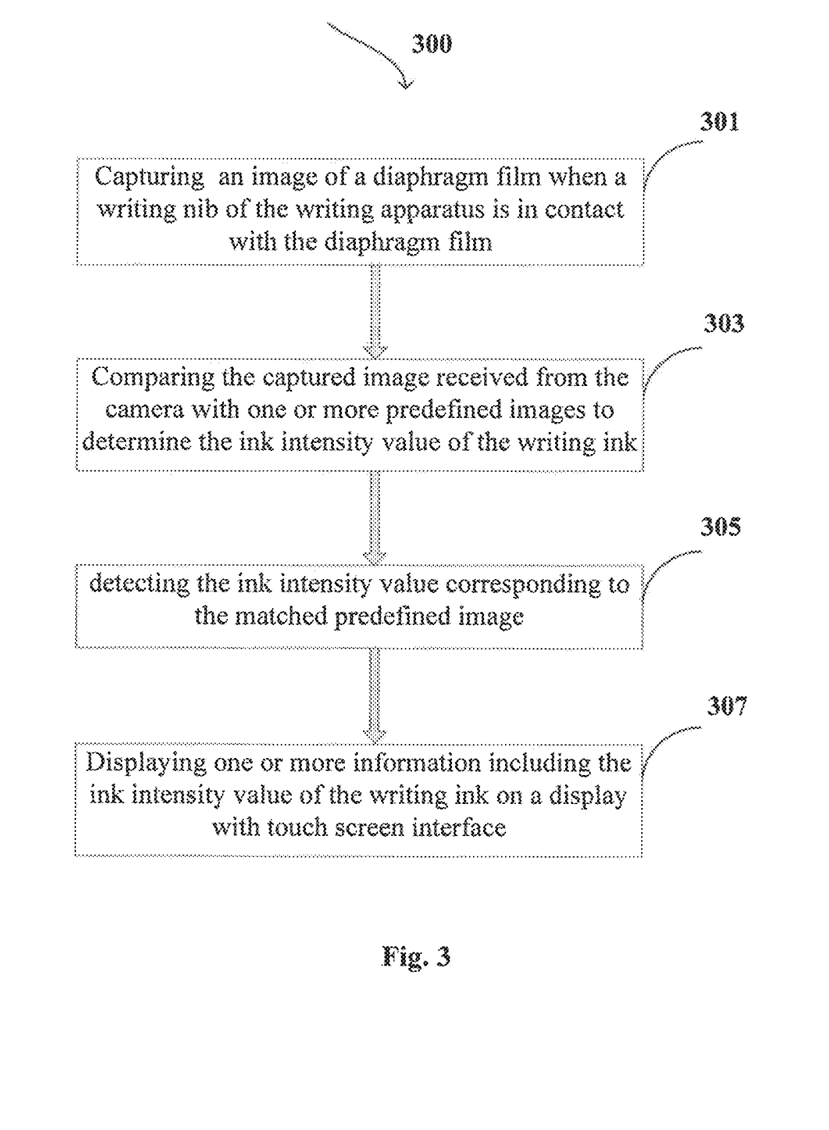

FIG. 3 illustrates a flowchart showing method for determining ink intensity value in a writing apparatus 203 in accordance with some embodiments of the present disclosure.

As illustrated in FIG. 3, the method 300 comprises one or more blocks for determining ink intensity value in a writing apparatus 203, when the writing apparatus 203 is closed by a closure unit 100. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, a camera 103 in the closure unit 100 captures an image of a diaphragm film 101 when a writing nib 205 of the writing apparatus 203 is in contact with the diaphragm film 101. The camera 103 captures the image of the diaphragm film 101 upon receiving an activation signal from the motion detection system 135. The motion detection system 135 transmits the activation signal upon detecting movement of the closure unit 100 from a resting position.

At block 303, a control unit 105 configured in the closure unit 100 compares the captured image 123 received from the camera 103 with one or more predefined images, wherein each of the one or more predefined images is associated with an ink intensity value, wherein the ink intensity value indicates percentage of ink present in the writing apparatus 203.

At block 305, the control unit 105 configured in the closure unit 100 detects the ink intensity value corresponding to the matched predefined image. The control unit 105 further comprises determining the ink intensity value of the writing ink in the writing apparatus 203 at one or more predetermined time intervals. Determining the ink intensity value at the one or more predetermined time intervals helps the one or more users and the maintenance personnel to refill the writing ink when the determined ink intensity value is less than a predetermined value.

At block 307, the user interface 107 in the closure unit 100 displays one or more information to the user of the writing apparatus 203. The one or more information comprises at least one of percentage of the ink intensity value of the writing ink in the writing apparatus 203, percentage of battery 130 remaining in the closure unit 100, color of the writing ink in the writing apparatus, location of the writing apparatus 203, model information of the writing apparatus, and estimated writing time of the writing apparatus 203.

Advantages of the Embodiment of the Present Disclosure are Illustrated Herein.

In an embodiment, the present disclosure provides a method to detect the ink intensity value of the writing ink in a writing apparatus.

In an embodiment, the present disclosure provides a method for providing a real time notification of intensity of the writing ink remaining in the writing apparatus to one or more maintenance personnel of the writing apparatus, thereby enhancing the user experience and avoiding the discomfort to the users.

In an embodiment, the present disclosure provides a method for notifying the one or more users of the writing apparatus about the one or more status information related to the writing apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Closure unit |
| 101 | Diaphragm film |
| 103 | Camera |
| 105 | Control Unit |
| 107 | User interface |
| 109 | Receiving module |
| 111 | Transmitting module |
| 113 | Detection module |
| 115 | Other module |
| 117 | Display with touch screen interface |
| 119 | Selection buttons |
| 121 | Memory unit |
| 123 | Captured images |
| 125 | Configuration information |
| 127 | Other data |
| 129 | Communication interface |
| 130 | Battery |
| 131 | Physical port |
| 133 | Motorized ink erasing arrangement |
| 135 | Motion detection system |
| 203 | Writing apparatus |
| 205 | Writing nib |
| 207 | Electronic circuitry |
| 209 | Traces of writing ink |

We claim:

1. A closure unit for a writing apparatus, the closure unit comprising:
   a diaphragm film, wherein the diaphragm film comes in contact with writing nib of the writing apparatus when the writing apparatus is closed by the closure unit;
   a camera to capture an image of the diaphragm film when the writing nib of the writing apparatus is in contact with the diaphragm film;
   a control unit configured to:
      compare the captured image received from the camera with one or more predefined images, wherein each of the one or more predefined images is associated with an ink intensity value, wherein the ink intensity value indicates percentage of ink present in the writing apparatus; and
      detect the ink intensity value corresponding to the matched predefined image; and
   a user interface to display one or more information including the ink intensity value.

2. The closure unit as claimed in claim 1 further comprises a motion detection system, wherein the motion detection system is configured to:
   detect movement of the closure unit, along with the writing apparatus, from a resting position; and
   transmit an activation signal to activate the camera and the control unit upon detecting movement of the closure unit.

3. The closure unit as claimed in claim 1 comprises a motorized ink erasing arrangement for erasing traces of the writing ink, formed on the diaphragm film, when the closure unit is removed from the writing apparatus.

4. The closure unit as claimed in claim 1, wherein the control unit provides a notification to at least one of users and maintenance personnel of the writing apparatus when the ink intensity value in the writing apparatus is less than a preconfigured value.

5. The closure unit as claimed in claim 1 comprises one or more communication interfaces to communicate with one or more computing devices associated with at least one of the users and the maintenance personnel of the writing apparatus.

6. The closure unit as claimed in claim 1, wherein the one or more information comprises at least one of percentage of the ink intensity value of the writing ink in the writing apparatus, percentage of battery remaining in the closure unit, color of the writing ink in the writing apparatus, location of the writing apparatus, model information of the writing apparatus and estimated writing time of the writing apparatus.

7. The closure unit as claimed in claim 6, wherein the control unit determines writing time of the writing apparatus based on the ink intensity value of the writing ink in the writing apparatus.

8. The closure unit as claimed in claim 1 further comprises a physical port for performing at least one of charging the battery in the closure unit and configuring the closure unit with one or more configuration information related to the writing apparatus.

9. The closure unit as claimed in claim 8, wherein the one or more configuration information comprises at least one of location of the writing apparatus, model information of the writing apparatus and color of the writing ink in the writing apparatus.

10. The closure unit as claimed in claim 1, wherein the control unit is further configured to determine the percentage of battery remaining in the closure unit and the ink intensity value of the writing ink in the writing apparatus at one or more predetermined time intervals.

11. The closure unit as claimed in claim 1, wherein the diaphragm film, the camera and the control unit are detachable from the closure unit.

12. The closure unit as claimed in claim 1, wherein the diaphragm film is made up of at least one of a translucent material and a transparent material.

13. The closure unit as claimed in claim 1 further comprises at least one of a display with touch screen interface and one or more selection buttons for providing the one or more information to at least one of the users and the maintenance personnel of the writing apparatus.

14. A method for determining ink intensity value in a writing apparatus when the writing apparatus is closed by a closure unit, the method comprising:
  capturing, by a camera in the closure unit, an image of a diaphragm film when a writing nib of the writing apparatus is in contact with the diaphragm film;
  comparing, by a control unit configured in the closure unit, the captured image received from the camera with one or more predefined images, wherein each of the one or more predefined images is associated with an ink intensity value, wherein the ink intensity value indicates percentage of ink present in the writing apparatus;
  detecting, by the control unit, the ink intensity value corresponding to the matched predefined image; and
  displaying, by a user interface in the closure unit, one or more information including the ink intensity value.

15. The method as claimed in claim 14, wherein determining the ink intensity value in the writing apparatus further comprises:
  detecting, by a motion detection system in the closure unit, movement of the closure unit, along with the writing apparatus, from a resting position; and
  transmitting, by the motion detection system, an activation signal to activate the camera and the control unit upon detecting movement of the closure unit.

16. The method as claimed in claim 14, wherein traces of the writing ink, formed on the diaphragm film, is erased by a motorized ink erasing arrangement in the control unit when the closure unit is separated from the writing apparatus.

17. The method as claimed in claim 14 further comprises providing a notification to at least one of users and maintenance personnel of the writing apparatus when the ink intensity value in the writing apparatus is less than a preconfigured value.

18. The method as claimed in claim 14, wherein one or more communication interfaces in the closure unit communicate with one or more computing devices associated with at least one of the users and the maintenance personnel of the writing apparatus.

19. The method as claimed in claim 14, wherein the one or more information comprises at least one of percentage of the ink intensity value of the writing ink in the writing apparatus, percentage of battery remaining in the closure unit, color of the writing ink in the writing apparatus, location of the writing apparatus, model information of the writing apparatus, and estimated writing time of the writing apparatus.

20. The method as claimed in claim 14 further comprises determining the percentage of battery remaining in the closure unit and the ink intensity value of the writing ink in the writing apparatus at one or more predetermined time intervals.

21. The method as claimed in claim 14 further comprises providing the one or more information to at least one of the users and the maintenance personnel of the writing apparatus by at least one of a display with touchscreen interface and one or more selection buttons.

* * * * *